United States Patent
Hapse et al.

(10) Patent No.: US 9,710,793 B2
(45) Date of Patent: Jul. 18, 2017

(54) ASSOCIATING A MEETING ROOM WITH A MEETING

(71) Applicant: International Business Machines Corporation, Armonk, NY (US)

(72) Inventors: Juilee S. Hapse, Ganeshmala (IN);
Priyanka K. Joshi, West Ryde (AU);
Shradha R. Nayak, Maharashtra (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 13/771,808

(22) Filed: Feb. 20, 2013

(65) Prior Publication Data

US 2014/0236876 A1 Aug. 21, 2014

(51) Int. Cl.
G06F 15/00 (2006.01)
G06F 15/18 (2006.01)
G06Q 10/10 (2012.01)
G06N 3/08 (2006.01)

(52) U.S. Cl.
CPC .......... G06Q 10/1095 (2013.01); G06N 3/08 (2013.01); G06Q 10/101 (2013.01)

(58) Field of Classification Search
CPC ............ H04L 12/1877; G01C 21/3407; G01C 21/3484; G06F 15/00; G06F 15/18
USPC ........................................................... 706/18
See application file for complete search history.

(56) References Cited

U.S. PATENT DOCUMENTS

| | | | |
|---|---|---|---|
| 2005/0273372 A1 | 12/2005 | Browne et al. | |
| 2006/0187859 A1* | 8/2006 | Shaffer | H04L 12/1877 370/260 |
| 2007/0288291 A1* | 12/2007 | Earle | G06Q 10/06311 705/7.13 |
| 2008/0133282 A1 | 6/2008 | Landar et al. | |
| 2008/0294999 A1 | 11/2008 | Bank et al. | |
| 2009/0044251 A1* | 2/2009 | Otake | H04L 63/102 726/3 |
| 2009/0150441 A1* | 6/2009 | Johnsen | G06Q 10/10 |
| 2009/0204714 A1 | 8/2009 | Ferrara et al. | |

(Continued)

OTHER PUBLICATIONS

U.S. Appl. No. 14/066,914, Non-Final Office Action, Jun. 17, 2016, 29 pg.

*Primary Examiner* — Stanley K Hill
*Assistant Examiner* — Peter Coughlan
(74) *Attorney, Agent, or Firm* — Cuenot, Forsythe & Kim, LLC (57) ABSTRACT

Arrangements described relate to associating a meeting room with a meeting. A meeting invitation being accessed by a first recipient can be identified, wherein the meeting invitation is sent to a plurality of recipients. A location associated with the first recipient of the meeting invitation can be identified, and whether the location associated with the first recipient is similar to a location associated with a sender of the meeting invitation can be determined. Responsive to determining that the location associated with the first recipient is not similar to the location associated with a sender of the meeting invitation, the first recipient can be prompted to reserve a meeting room at the location associated with the first recipient. Responsive to receiving from the first recipient an indication of the meeting room being reserved, an association between the meeting and the meeting room can be created.

16 Claims, 3 Drawing Sheets

(56) References Cited

U.S. PATENT DOCUMENTS

| | | | |
|---|---|---|---|
| 2009/0265280 A1* | 10/2009 | Taneja | G06Q 50/188 705/80 |
| 2009/0281860 A1* | 11/2009 | Bhogal | G06Q 10/1095 705/7.19 |
| 2009/0327227 A1* | 12/2009 | Chakra | G06Q 10/10 |
| 2010/0250690 A1 | 9/2010 | Chen et al. | |
| 2011/0106573 A1* | 5/2011 | McNamara | G06Q 10/02 705/5 |
| 2011/0231493 A1 | 9/2011 | Dyor | |
| 2011/0314115 A1* | 12/2011 | Nagaraj | G06Q 10/1095 709/206 |
| 2012/0005613 A1 | 1/2012 | O'Sullivan et al. | |
| 2012/0110475 A1 | 5/2012 | Han et al. | |
| 2012/0136572 A1* | 5/2012 | Norton | G01C 21/3407 701/465 |
| 2012/0232786 A1* | 9/2012 | Chen | G06Q 10/109 701/423 |
| 2013/0143587 A1* | 6/2013 | Williams | H04W 4/023 455/456.1 |
| 2014/0236659 A1 | 8/2014 | Hapse et al. | |

\* cited by examiner

ASSOCIATING A MEETING ROOM WITH A MEETING

BACKGROUND

Arrangements described herein relate to managing meeting invitations.

People in an organization may have meetings with colleagues in other locations. Meeting times may be adjusted to each location's local time. When a user receives an invitation for a meeting from colleagues in a different location, the user may then need to reserve a meeting room and/or other resources locally. If other users are located in the same location, the user may need to manually inform such other users that the local meeting room has been reserved.

BRIEF SUMMARY

Arrangements described herein relate to managing meeting invitations and, more particularly, to associating a meeting room with a meeting.

An embodiment can include a method of associating a meeting room with a meeting. A meeting invitation being accessed by a first recipient can be identified, wherein the meeting invitation is sent to a plurality of recipients. A location associated with the first recipient of the meeting invitation can be identified, and whether the location associated with the first recipient is similar to a location associated with a sender of the meeting invitation can be determined. Responsive to determining that the location associated with the first recipient is not similar to the location associated with a sender of the meeting invitation, the first recipient can be prompted to reserve a meeting room at the location associated with the first recipient. Responsive to receiving from the first recipient an indication of the meeting room being reserved, an association between the meeting and the meeting room can be created, wherein the association between the meeting and the meeting room is configured to be presented to at least a second recipient who receives the meeting invitation, and who is associated with the location associated with the first recipient, when the second recipient accesses the meeting invitation.

In a further embodiment, responsive to determining that a number of recipients of the meeting invitation have accepted the meeting invitation and to meet in the reserved meeting room exceeds the capacity of the reserved meeting room, at least one of the recipients can be prompted to reserve at least one new meeting room. Responsive to receiving a selection of the new meeting room, at least one of the recipients of the meeting invitation who have accepted the meeting invitation to meet in the previously reserved meeting room can be notified to instead meet in the new meeting MOM.

Another embodiment can include a system having a processor. The processor can be configured to initiate executable operations including identifying a meeting invitation being accessed by a first recipient, wherein the meeting invitation is sent to a plurality of recipients. A location associated with the first recipient of the meeting invitation can be identified, and whether the location associated with the first recipient is similar to a location associated with a sender of the meeting invitation can be determined. Responsive to determining that the location associated with the first recipient is not similar to the location associated with a sender of the meeting invitation, the first recipient can be prompted to reserve a meeting room at the location associated with the first recipient. Responsive to receiving from the first recipient an indication of the meeting room being reserved, an association between the meeting and the meeting room can be created, wherein the association between the meeting and the meeting room is configured to be presented to at least a second recipient who receives the meeting invitation, and who is associated with the location associated with the first recipient, when the second recipient accesses the meeting invitation.

Another embodiment can include a computer program product for associating a meeting room with a meeting. The computer program product can include a computer-readable storage medium having stored thereon program code that, when executed, configures a processor to perform operations including identifying a meeting invitation being accessed by a first recipient, wherein the meeting invitation is sent to a plurality of recipients. A location associated with the first recipient of the meeting invitation can be identified, and whether the location associated with the first recipient is similar to a location associated with a sender of the meeting invitation can be determined. Responsive to determining that the location associated with the first recipient is not similar to the location associated with a sender of the meeting invitation, the first recipient can be prompted to reserve a meeting room at the location associated with the first recipient. Responsive to receiving from the first recipient an indication of the meeting room being reserved, an association between the meeting and the meeting room can be created, wherein the association between the meeting and the meeting room is configured to be presented to at least a second recipient who receives the meeting invitation, and who is associated with the location associated with the first recipient, when the second recipient accesses the meeting invitation.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to managing meeting invitations and, more particularly, to associating a meeting room with a meeting. In illustration, a person (hereinafter "recipient") can receive an invitation for a meeting. A location associated with the recipient, for example the location where the recipient works, can be automatically identified and compared to the location associated with the sender of the invitation. If the locations are not similar (e.g., not in the same building, city, etc.), the recipient can be prompted to select a meeting room at the recipient's location. For example, a list of meeting rooms available at the time of the meeting can be presented to the user when the user accesses the meeting invitation, and the user can select at least one of the meeting rooms to reserve the meeting room. The selected meeting room can be associated with the meeting.

When one or more other recipients who receive the meeting invitation access the invitation, the association between the meeting room and the meeting can be indicated to such other recipients. For example, when such a recipient opens the meeting invitation or accepts the meeting invitation, a message can be presented to the recipient indicating the meeting room that has been reserved for the meeting and that the recipient can go to that meeting room at the appropriate time to participate in the meeting.

In some instances the meeting room may change. For example, the number of recipients who accept the meeting invitation may exceed the capacity of the meeting room. In such case, an alert can be presented to one of the recipients to select a new meeting room. For instance, a list of available meeting rooms having sufficient capacity can be presented to the recipient. When the new meeting room is reserved, recipients who have already accepted the meeting invitation can be alerted to the meeting room change. For example, an updated meeting invitation or an e-mail can be sent to such recipients indicating the meeting room change.

Figure 1:
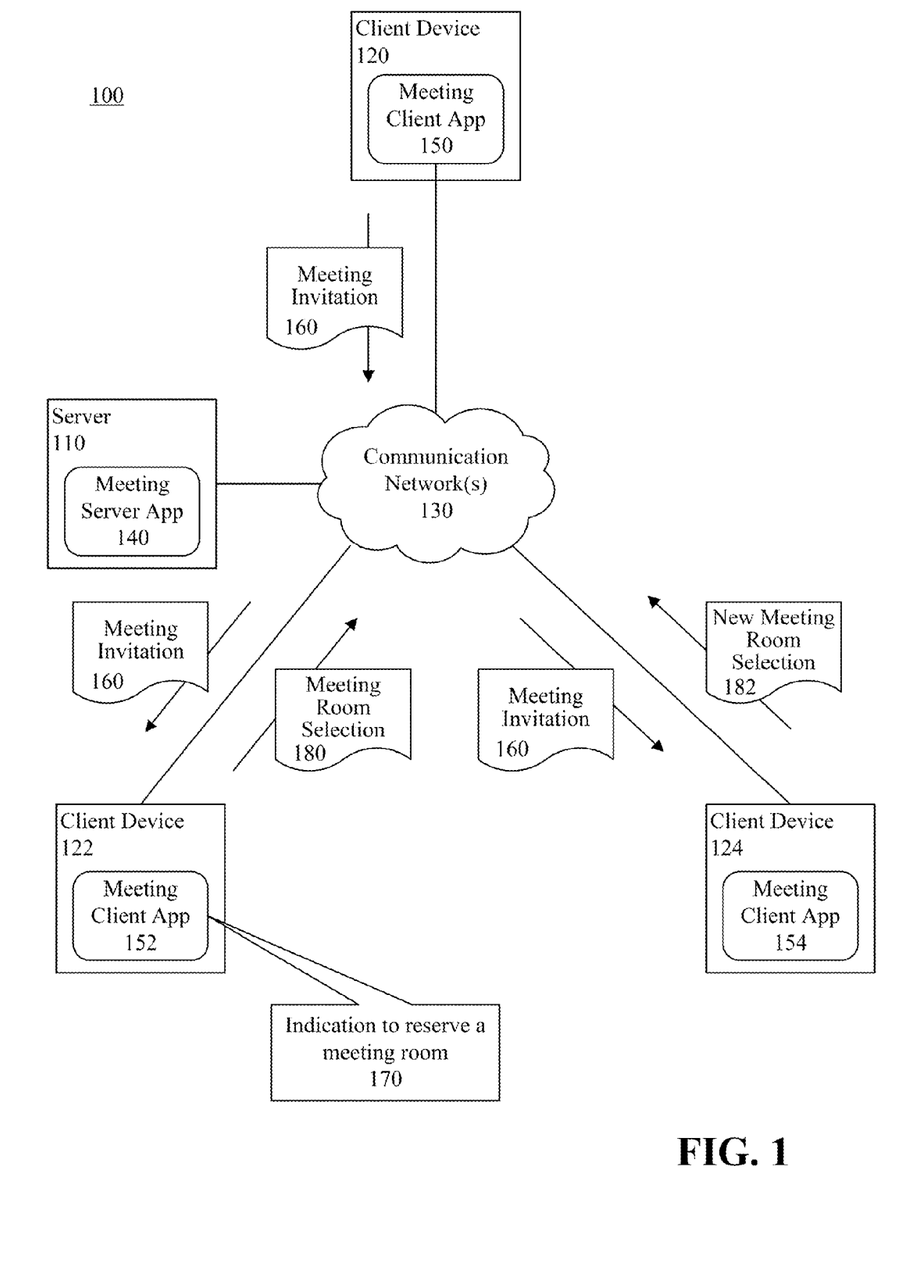
FIG. 1 is a block diagram illustrating a system for associating a meeting room with a meeting in accordance with one embodiment disclosed within this specification.

FIG. 1 is a block diagram illustrating a system 100 for associating a meeting room with a meeting in accordance with one embodiment disclosed within this specification. The system 100 can include a server 110 and a plurality of client devices 120, 122, 124. The server 110 and the client devices 120-124 can be communicatively linked via one or more communication networks 130. The communication networks 130 can be implemented as, or include, any of a variety of different networks such as a WAN, a LAN, a wireless network, a mobile network (e.g., a cellular communication network), a Virtual Private Network (VPN), the Internet, the Public Switched Telephone Network (PSTN), or the like.

The server 110 can be implemented as a processing system comprising at least one processor and memory, or as a plurality of systems which are communicatively linked, configured to execute a meeting server application 140. The meeting server application 140 can be a stand-alone application configured to run on a suitable operating system hosted by the server 110, or can be a plug-in or module configured to execute as a component of another application, such as a calendaring server application, a scheduling server application, an e-mail server application, or the like.

The client devices 120-124 each can be implemented as a processing system comprising at least one processor and memory. Examples of such processing systems include, but are not limited to, a computer (e.g., a workstation, a desktop computer, a laptop computer, a tablet computer, a netbook computer, a mobile computer, etc.), a smart phone, a personal digital assistant, a network appliance, or the like. A respective meeting client application 150, 152, 154 can execute on each of the client devices 120-124. The meeting client applications 150-154 can be stand-alone applications configured to run on a suitable operating system hosted by the client devices 120-124, or can be a plug-ins or modules configured to execute as components of other applications, such as a calendaring client application, a scheduling client application, an e-mail client application, or the like.

In operation, a user of the client device 120 (e.g., a person) can, via the meeting client application 150, generate a meeting invitation 160 and send the meeting invitation 160 to one or more recipients. The meeting invitation 160 can be sent via the meeting server application 140, though this need not be the case. In any case, the meeting client applications 152-154 can receive the meeting invitation 160. As used herein, the term "meeting invitation" means an invitation to participate in a meeting or conference. When generating or sending the meeting invitation 160, the sender can reserve a meeting room at a location associated with the sender.

When a first recipient using the client device 122 accesses the meeting invitation, for example by opening the meeting invitation or accepting the meeting invitation, the meeting client application 152 can determine a location associated with the first recipient. Further, the meeting client application 152 can determine whether the location associated with the first recipient is similar to a location associated with a sender of the meeting invitation 160. In another arrangement, the meeting client application 152 can communicate with the meeting server application 140, and the meeting server application 140 can make such determination. In yet another arrangement, the meeting server application 140 can determine the location associated with the first recipient and determine whether the location associated with the first recipient is similar to a location associated with a sender of the meeting invitation 160. In such arrangement, when the first recipient accesses the meeting invitation, the meeting client application 152 can communicate a message indicating such to the meeting server application 140. Thus, the meeting client application 152 and/or the meeting server application 140 can identify the meeting invitation being accessed by the first recipient.

The respective locations of the sender and the first recipient can be determined in any suitable manner. For example, the locations can be determined based on respective e-mail identifiers associated with the sender and the first recipient, respective IP addresses associated with the sender and the first recipient, respective records associated with the sender and the first recipient contained in a personnel directory (not shown), GPS coordinates, or the like. In another arrangement, the first recipient can be prompted by the meeting server application 140 or the meeting client application 152 to enter the location associated with the first recipient. For example, the first recipient can enter a location where the first recipient intends to be at the time scheduled time of the meeting. Moreover, the sender of the meeting invitation can enter a location where the sender intends to be at the time scheduled time of the meeting. The location associated with the sender can be communicated to the meeting server application 140 and/or to the meeting client application 152. Indeed, such location can be indicated in the meeting invitation 160.

Further, the meeting server application 140 and/or the meeting client applications 150-152 can implement artificial intelligence to learn the respective working patterns of the sender and first recipient in order to predict the respective locations associated with the sender and first recipient. Thus, rather than newly discovering the respective locations when the meeting invitation 160 is accessed, the artificial intelligence can be used to predict the respective locations. Of course, the sender and first recipient can be prompted to confirm the respective predicted locations and change the locations if the predictions are incorrect.

A determination can be made as to whether the location associated with the first recipient corresponds to the location associated with the sender. Such determination can be made by the meeting server application 140 or the meeting client application 152. Responsive to the determination indicating that the locations do not correspond (i.e., they are different locations), an indication 170 can be provided to the first recipient to prompt the first participant to reserve a meeting room at the location associated with the first recipient. For example, a pop-up window can be presented by the meeting server application 140 or the meeting client application 152 to indicate that the sender of the meeting invitation is at another location and that the first recipient may wish to reserve a local meeting room from which to participate in the meeting. Accordingly, the first recipient can initiate reservation an appropriate meeting room. If the meeting room is unavailable at the scheduled time of the meeting, the reservation can be declined and the first recipient can be prompted to reserve another meeting room. The meeting room that is reserved can be used by the first recipient to participate in the meeting at the scheduled time.

In one aspect of the present arrangements, the meeting server application 140 or the meeting client application 152 can suggest to the first recipient a meeting room that is available at the scheduled time of the meeting and prompt the first recipient to confirm a reservation for that meeting room. In another arrangement, the meeting server application 140 or the meeting client application 152 can present to the first recipient a list of meeting rooms available at the location associated with the first recipient at the scheduled time of the meeting. In one arrangement, the meeting rooms indicated in the list can be meeting rooms having a maximum capacity at least equal to the total number of recipients associated with the location with which the first recipient is associated.

The list can be provided in the pop-up window or another window. From the list, the first recipient can select a meeting room to reserve, and reserve that meeting room. For example, the meeting server application 140 or the meeting client application 152 can interface with a meeting room reservation application to access the list of available meeting rooms, and automatically reserve the meeting room selected by the first participant at the scheduled time of the meeting. The meeting room reservation application may be executed on the server 110, the client device 122 or on another processing system to which the server 110 and/or client device 122 is/are communicatively linked.

The above described processes can be implemented by the meeting server application 140 or the meeting client application 150 to reserve the meeting room reserved by the sender of the meeting invitation 160. In this regard, the meeting room reservation application executed on the server 110, or a meeting room reservation application executed on the client device 120 may be used to reserve the meeting room at the location associated with the sender. In this regard, the sender of the meeting invitation 160 can select a meeting room having suitable capacity for the number of people expected to participate in the meeting at the location associated with the sender.

The reserved meeting room can be associated with the meeting. For example, once the first recipient has reserved the meeting room, the meeting client application 152 can generate a meeting room selection 180 and communicate this to the meeting server application 140. In another aspect, the client device 122 can communicate with the meeting server application 140, and the meeting room selection 180 can be input directly into the meeting server application 140. In one arrangement, the meeting room selection can include an association between the meeting and the selected meeting room, and such association can be configured to be presented to other recipients associated with the location that is associated with the first recipient. In this regard, the meeting room selection 180 can include an identifier for the meeting and an identifier for the selected meeting room. The meeting room selection 180 further may include an indicator of the capacity of the selected meeting room, an identifier corresponding to who reserved the selected meeting room, etc. Responsive to receiving the meeting room selection 180, the meeting server application 140 can generate a record in a data table (e.g., in a database) that includes the meeting identifier, an identifier corresponding to the reserved meeting room, the capacity of the reserved meeting room, who reserved the meeting room, and any other pertinent information. In another arrangement, the meeting room selection 180 need not create the association between the reserved meeting room and the meeting. Instead, such association can be created by the meeting server application 140.

When other recipients of the meeting invitation 160 access the meeting invitation 160, the respective locations associated with such recipients can be determined as previously described. Those recipients whose associated locations correspond to the location associated with the first recipient (e.g., they are the same location) can be presented the association between the meeting and the selected meeting room. For example, such recipients can be presented a suggestion to use the reserved meeting room to participate in the meeting. The additional recipients can accept or decline such suggestion. Indeed, one or more of the additional recipients may choose to reserve another meeting room, for example as previously described.

In illustration, the meeting server application 140 or the meeting client application 154 can receive an indication from a second recipient of whether the reserved meeting room at the first recipient's associated location is suitable for the second recipient. Responsive to the indication indicating that the reserved meeting room is not suitable for the second recipient, the second recipient can be prompted to reserve another meeting room. For example, an indication of a meeting room suitable to the second recipient can be received from the second recipient. In a further aspect, responsive to receiving from the second recipient an indication indicating that the reserved meeting room is not suitable for the second recipient, a list of new meeting rooms available at the location associated with the second recipient at the scheduled time of the meeting can be presented to the second recipient. Since the second recipient indicated the meeting room reserved by the first participant is not suitable, the list can be exclusive of the meeting room selected by the first recipient. The second participant can select a suitable meeting room from the list.

The meeting server application 140 and/or one or more of the meeting client applications 150-154 can monitor the number of recipients who accept the meeting invitation 160 and choose to participate in the meeting room reserved by the first participant. In some instances the number of such recipients may exceed the capacity of the reserved meeting room. Responsive to determining that this is the case, at least one of the recipients can be prompted to reserve at least one new meeting room, for example as previously described. Responsive to such recipient reserving the new meeting room, at least one other recipient who has accepted the meeting invitation to meet in the originally reserved meeting room can be notified to meet in the new meeting room.

In illustration, when a second recipient using the client device 124 accesses (e.g., accepts) the meeting invitation 160, and the location associated with the second recipient corresponds to the location associated with the first recipient, the meeting server application 140 can identify the total number of recipients who have accepted the meeting invitation 160 and who are scheduled to use the originally selected meeting room. If this number exceeds the capacity of the originally selected meeting room, a new meeting room can be reserved by the second recipient, and the meeting client application 154 can generate a new meeting room selection 182 and communicate this to the meeting server application 140. In another arrangement, the meeting room selection can be communicated directly to the meeting server application 140 by the client device 124 without using the meeting client application 154. The new meeting room selection 182 can include an association between the new meeting room and the meeting. In this regard, the new meeting room selection 182 can include an identifier for the meeting, an identifier for the new meeting room, an indicator of the capacity of the new meeting room, an identifier corresponding to who reserved the new meeting room, etc. Further, the meeting server application 140 can generate a new record to the data table with such information, or update the previously generated record.

In one arrangement, some recipients can use the originally reserved meeting room and some recipients can use the new meeting room to participate in the meeting. In this case, a portion of the recipients associated with that location can be notified to use the new meeting room for the meeting. In another arrangement, the new meeting room can have adequate capacity for all of the recipients who will attend the meeting at that location, and the reservation of the original meeting room can be cancelled. In this case, all of the recipients associated with that location can be notified to use the new meeting room for the meeting. The notifications can be generated as an update to the meeting invitation 160, as e-mails sent to the affected recipients, or generated in any other suitable manner.

Figure 2:
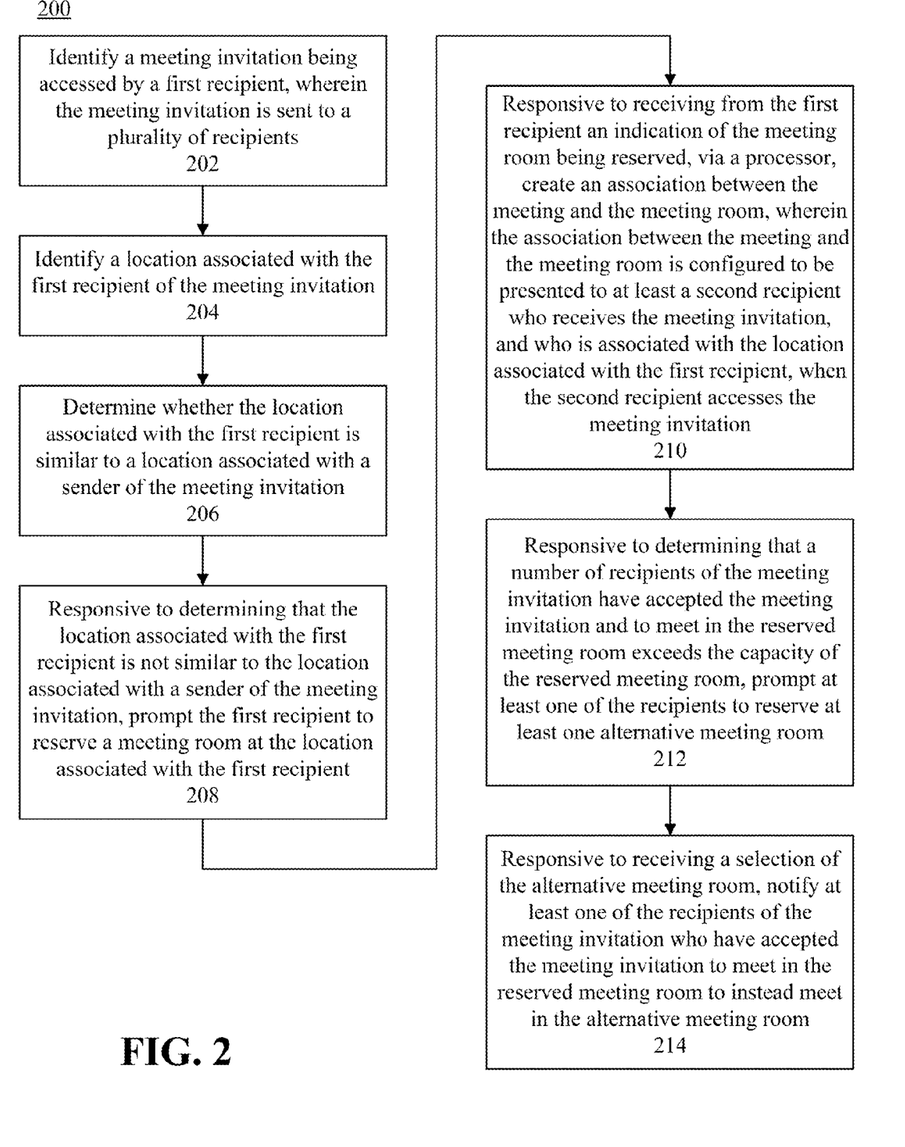
FIG. 2 is a flow chart illustrating a method of associating a meeting room with a meeting in accordance with another embodiment disclosed within this specification.

FIG. 2 is a flow chart illustrating a method 200 of associating a meeting room with a meeting in accordance with another embodiment disclosed within this specification. At step 202 a meeting invitation being accessed by a first recipient can be identified, wherein the meeting invitation is sent to a plurality of recipients. At step 204, a location associated with the first recipient of the meeting invitation can be identified. At step 206, a determination can be made as to whether the location associated with the first recipient is similar to a location associated with a sender of the meeting invitation. At step 208, responsive to determining that the location associated with the first recipient is not similar to the location associated with a sender of the meeting invitation, the first recipient can be prompted to reserve a meeting room at the location associated with the first recipient. At step 210, responsive to receiving from the first recipient an indication of the meeting room being reserved, an association between the meeting and the meeting room can be created via a processor. The association between the meeting and the meeting room can be configured to be presented to at least a second recipient who receives the meeting invitation, and who is associated with the location associated with the first recipient, when the second recipient accesses the meeting invitation.

At step 212, responsive to determining that a number of recipients of the meeting invitation have accepted the meeting invitation and to meet in the reserved meeting room exceeds the capacity of the reserved meeting room, at least one of the recipients can be prompted to reserve at least one new meeting room. At step 214, responsive to receiving a selection of the new meeting room, at least one of the recipients of the meeting invitation who have accepted the meeting invitation can be notified to meet in the reserved meeting room to instead meet in the new meeting room.

Figure 3:
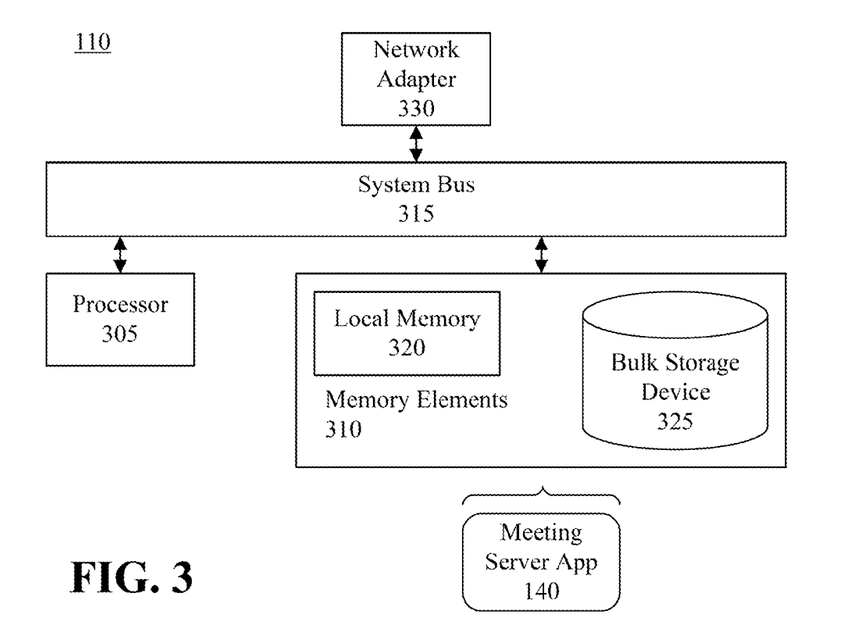
FIG. 3 depicts a server for associating a meeting room with a meeting in accordance with another embodiment disclosed within this specification.

FIG. 3 depicts the server 110 of FIG. 1, which may be used to associate a meeting room with a meeting in accordance with another embodiment disclosed within this specification. The server 110 can include at least one processor 305 (e.g., a central processing unit) coupled to memory elements 310 through a system bus 315 or other suitable circuitry. As such, the server 110 can store program code within the memory elements 310. The processor 305 can execute the program code accessed from the memory elements 310 via the system bus 315. It should be appreciated that the server 110 can be implemented in the form of any system including a processor and memory that is capable of performing the functions and/or operations described within this specification. For example, the server 110 can be implemented as a processing system, such as a computer, or one or more systems that are communicatively linked.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The server 110 also can include one or more cache memories (not shown) that provide temporary storage of at least some program code in order to reduce the number of times program code must be retrieved from the bulk storage device 325 during execution.

One or more input/output (I/O) devices, such as a network adapter 330, can be coupled to the server 110. The I/O devices can be coupled to the server 110 either directly or through intervening I/O controllers. Modems, cable modems, transceivers, and Ethernet cards are examples of different types of network adapters 330 that can be used with server 110.

As pictured in FIG. 3, the memory elements 310 can store the meeting server application 140. Being implemented in the form of executable program code, the meeting server application 140 can be executed by the server 110 and, as such, can be considered part of the server 110. Moreover, the meeting server application 140 is a functional data structure that imparts functionality when employed as part of the server 110. The meeting server application 140 can perform one or more of the functions described with respect to FIG. 1.

Figure 4:
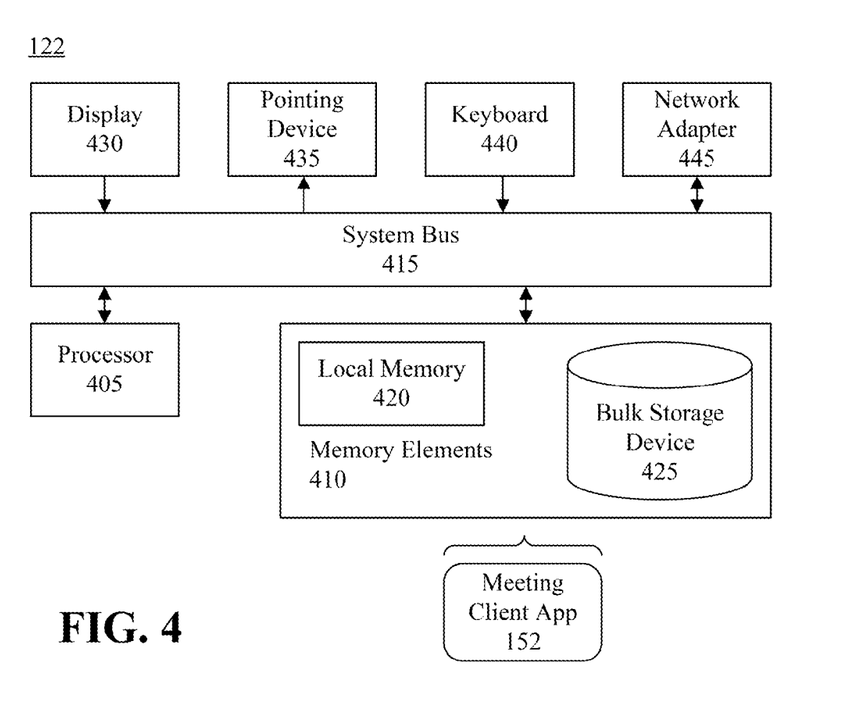
FIG. 4 depicts a client device for associating a meeting room with a meeting in accordance with another embodiment disclosed within this specification.

FIG. 4 depicts the client device 122 of FIG. 1, which may be used to associate a meeting room with a meeting in accordance with another embodiment disclosed within this specification. The client devices 120, 124 may be configured in a similar manner.

The client device 122 can include at least one processor 405 coupled to memory elements 410 through a system bus 415 or other suitable circuitry. As such, the client device 122 can store program code within the memory elements 410. The processor 405 can execute the program code accessed from the memory elements 410 via the system bus 415. It should be appreciated that the client device 122 can be implemented in the form of any system including a processor and memory that is capable of performing the functions and/or operations described within this specification.

The memory elements 410 can include one or more physical memory devices such as, for example, local memory 420 and one or more bulk storage devices 425. The bulk storage device(s) 425 can be implemented as a hard disk drive (HDD), solid state drive (SSD), or other persistent data storage device. The client device 122 also can include one or more cache memories (not shown) that provide temporary storage of at least some program code in order to reduce the number of times program code must be retrieved from the bulk storage device 425 during execution.

Input/output (I/O) devices such as a display 430, a pointing device 435 and, optionally, a keyboard 440 can be coupled to the client device 122. The I/O devices can be coupled to the client device 122 either directly or through intervening I/O controllers. For example, the display 430 can be coupled to the client device 122 via a graphics processing unit (GPU), which may be a component of the processor 405 or a discrete device. One or more network adapters 445 also can be coupled to client device 122 to enable client device 122 to become coupled to other systems, computer systems, remote printers, and/or remote storage devices through intervening private or public networks. Modems, cable modems, transceivers, and Ethernet cards are examples of different types of network adapters 445 that can be used with client device 122.

As pictured in FIG. 4, the memory elements 410 can store the meeting client application 152. Being implemented in the form of executable program code, the meeting client application 152 can be executed by the client device 122 and, as such, can be considered part of the client device 122. Moreover, the meeting client application 152 is a functional data structure that imparts functionality when employed as part of the client device 122. The meeting client application 152 can perform one or more of the functions described with respect to FIG. 1.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
    a processor programmed to initiate executable operations comprising:
    identifying, by a meeting server application executed by the processor, an electronic meeting invitation for a meeting being accessed by a first recipient, wherein the electronic meeting invitation is sent to a plurality of recipients;
    identifying a location associated with the first recipient of the electronic meeting invitation;
    determining whether the location associated with the first recipient corresponds to a location associated with a sender of the electronic meeting invitation who has reserved a first meeting room for the meeting at a location associated with the sender;
    responsive to determining that the location associated with the first recipient does not correspond to the location associated with the sender of the electronic meeting invitation, prompting the first recipient to reserve a second meeting room for the meeting at the location associated with the first recipient, wherein the second meeting room at the location associated with the first recipient is not located at the location associated with the sender of the electronic meeting invitation and the first meeting room remains reserved for the meeting; and
    responsive to receiving from the first recipient an indication of the second meeting room being reserved, creating an association between the meeting and the second meeting room by automatically generating a record in a data table that identifies at least the meeting and the second meeting room, wherein the association between the meeting and the second meeting room is configured to be presented by a meeting client application executing on a client device to at least a second recipient who receives the electronic meeting invitation, and who is associated with the location associated with the first recipient, responsive to the second recipient accessing the electronic meeting invitation.

2. The system of claim 1, the method further comprising:
    responsive to receiving the electronic meeting invitation by the first recipient, presenting to the first recipient a list of meeting rooms available at the location associated with the first recipient at the scheduled time of the meeting;
    wherein receiving from the first recipient an indication of the meeting room being reserved comprises receiving from the first recipient a selection of at least one of the available meeting rooms.

3. The system of claim 2, the method further comprising:
determining a total number of recipients associated with the location associated with the first recipient;
wherein presenting to the first recipient a list of meeting rooms available at the location associated with the first recipient at the scheduled time of the meeting comprises:
presenting to the first recipient a list of meeting rooms having a maximum capacity at least equal to the total number of recipients associated with the location with which the first recipient is associated.

4. The system of claim 1, the method further comprising:
receiving an indication from the second recipient of whether the reserved meeting room is suitable for the second recipient; and
responsive to the indication indicating that the reserved meeting room is not suitable for the second recipient, prompting the second recipient to reserve another meeting room.

5. The system of claim 4, the method further comprising:
responsive to the indication indicating that the reserved meeting room is not suitable for the second recipient, presenting to the second recipient a list of new meeting rooms available at the location associated with the second recipient, exclusive of the meeting room selected by the first recipient, at the scheduled time of the meeting; and
receiving from the second recipient a selection of at least one of the new meeting rooms.

6. The system of claim 4, the method further comprising:
responsive to the indication indicating that the reserved meeting room is not suitable for the second recipient, receiving from the second recipient an indication of a meeting room suitable to the second recipient.

7. The system of claim 1, the method further comprising:
responsive to determining that a number of recipients of the electronic meeting invitation have accepted the electronic meeting invitation and to meet in the reserved meeting room exceeds the capacity of the reserved meeting room, prompting at least one of the recipients to reserve at least one new meeting room; and
responsive to receiving a selection of the new meeting room, notifying at least one of the recipients of the electronic meeting invitation who have accepted the electronic meeting invitation to meet in the reserved meeting room to instead meet in the new meeting room.

8. The system of claim 1, wherein identifying a location associated with the first recipient of the electronic meeting invitation comprises:
implementing artificial intelligence to learn a respective working pattern of the first recipient and, based on the working pattern, predicting the location associated with the first recipient.

9. A computer program product for associating a meeting room with a meeting, the computer program product comprising a computer-readable storage device having program code stored thereon, the program code executable by a processor to perform a method comprising:
identifying, by the processor, an electronic meeting invitation for a meeting being accessed by a first recipient, wherein the electronic meeting invitation is sent to a plurality of recipients;
identifying, by the processor, a location associated with the first recipient of the electronic meeting invitation;
determining, by the processor, whether the location associated with the first recipient corresponds to a location associated with a sender of the electronic meeting invitation who has reserved a first meeting room for the meeting at a location associated with the sender;
responsive to determining that the location associated with the first recipient does not correspond to the location associated with the sender of the electronic meeting invitation, prompting, by the processor, the first recipient to reserve a second meeting room for the meeting at the location associated with the first recipient, wherein the second meeting room at the location associated with the first recipient is not located at the location associated with the sender of the electronic meeting invitation and the first meeting room remains reserved for the meeting; and
responsive to receiving from the first recipient an indication of the second meeting room being reserved, creating, by the processor, an association between the meeting and the second meeting room by automatically generating a record in a data table that identifies at least the meeting and the second meeting room, wherein the association between the meeting and the second meeting room is configured to be presented by a meeting client application executing on a client device to at least a second recipient who receives the electronic meeting invitation, and who is associated with the location associated with the first recipient, responsive to the second recipient accessing the electronic meeting invitation.

10. The computer program product of claim 9, the method further comprising:
responsive to receiving the electronic meeting invitation by the first recipient, presenting, by the processor, to the first recipient a list of meeting rooms available at the location associated with the first recipient at the scheduled time of the meeting;
wherein receiving from the first recipient an indication of the meeting room being reserved comprises receiving from the first recipient a selection of at least one of the available meeting rooms.

11. The computer program product of claim 10, the method further comprising:
determining, by the processor, a total number of recipients associated with the location associated with the first recipient;
wherein presenting to the first recipient a list of meeting rooms available at the location associated with the first recipient at the scheduled time of the meeting comprises:
presenting, by the processor, to the first recipient a list of meeting rooms having a maximum capacity at least equal to the total number of recipients associated with the location with which the first recipient is associated.

12. The computer program product of claim 9, the method further comprising:
receiving, by the processor, an indication from the second recipient of whether the reserved meeting room is suitable for the second recipient; and
responsive to the indication indicating that the reserved meeting room is not suitable for the second recipient, prompting, by the processor, the second recipient to reserve another meeting room.

13. The computer program product of claim 12, the method further comprising:
responsive to the indication indicating that the reserved meeting room is not suitable for the second recipient, presenting, by the processor, to the second recipient a list of new meeting rooms available at the location associated with the second recipient, exclusive of the meeting room selected by the first recipient, at the scheduled time of the meeting; and receiving, by the processor, from the second recipient a selection of at least one of the new meeting rooms.

14. The computer program product of claim 12, the method further comprising:

responsive to the indication indicating that the reserved meeting room is not suitable for the second recipient, receiving, by the processor, from the second recipient an indication of a meeting room suitable to the second recipient.

15. The computer program product of claim 9, the method further comprising:

responsive to determining that a number of recipients of the electronic meeting invitation have accepted the electronic meeting invitation and to meet in the reserved meeting room exceeds the capacity of the reserved meeting room, prompting, by the processor, at least one of the recipients to reserve at least one new meeting room; and responsive to receiving a selection of the new meeting room, notifying, by the processor, at least one of the recipients of the electronic meeting invitation who have accepted the electronic meeting invitation to meet in the reserved meeting room to instead meet in the new meeting room.

16. The computer program product of claim 9 wherein identifying a location associated with the first recipient of the electronic meeting invitation comprises:

implementing, by the processor, artificial intelligence to learn a respective working pattern of the first recipient and, based on the working pattern, predicting the location associated with the first recipient.

* * * * *